(12) United States Patent
Mori et al.

(10) Patent No.: US 11,795,867 B2
(45) Date of Patent: Oct. 24, 2023

(54) OPPOSED-PISTON ENGINE

(71) Applicant: MITSUBISHI HEAVY INDUSTRIES, LTD., Tokyo (JP)

(72) Inventors: Masafumi Mori, Tokyo (JP); Yuuki Koshiba, Tokyo (JP); Kengo Tanaka, Tokyo (JP); Takashi Ueda, Tokyo (JP); Shigetoshi Sugata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/786,366

(22) PCT Filed: Jan. 27, 2021

(86) PCT No.: PCT/JP2021/002778
§ 371 (c)(1),
(2) Date: Jun. 16, 2022

(87) PCT Pub. No.: WO2021/153595
PCT Pub. Date: Aug. 5, 2021

(65) Prior Publication Data
US 2023/0014414 A1 Jan. 19, 2023

(30) Foreign Application Priority Data
Jan. 30, 2020 (JP) .................... 2020-013511

(51) Int. Cl.
*F02B 23/06* (2006.01)
*F02B 75/28* (2006.01)
(Continued)

(52) U.S. Cl.
CPC ...... *F02B 23/0624* (2013.01); *F02B 23/0669* (2013.01); *F02B 75/282* (2013.01); *F02M 61/14* (2013.01); *F02M 61/1806* (2013.01)

(58) Field of Classification Search
CPC .. F02B 23/0624; F02B 23/0669; F02B 23/06; F02B 75/282; F02M 61/14; F02M 61/1806; F02M 61/18; Y02T 10/12
(Continued)

(56) References Cited

U.S. PATENT DOCUMENTS 9,631,549 B2    4/2017  Abani et al.
2013/0014718 A1* 1/2013  Shen ................... F02B 23/0675
                                                    123/18 A
2016/0290224 A1  10/2016 Abani et al.

FOREIGN PATENT DOCUMENTS

JP    61-17420 U    1/1986
JP    2-28525 U     2/1990
(Continued)

OTHER PUBLICATIONS

International Preliminary Report on Patentability and Written Opinion of the International Searching Authority for International Application No. PCT/JP2021/002778, dated Aug. 11, 2022, with an English translation.
(Continued)

*Primary Examiner* — Hai H Huynh
(74) *Attorney, Agent, or Firm* — Birch, Stewart, Kolasch & Birch, LLP (57) ABSTRACT

An opposed-piston engine according to an embodiment is a first fuel injection device configured to inject fuel from a circumferential wall surface of at least one cylinder into the cylinder, and a second fuel injection device disposed to be displaced in a circumferential direction so as to be opposite to the first fuel injection device across an axial center of the cylinder. Each of the first fuel injection device and the second fuel injection device includes a plurality of injection holes having different injection directions, in a cross-section orthogonal to the axial direction. A direction directed by a first downstream injection hole is configured to pass through
(Continued)

a second injection region, and a direction directed by a second downstream injection hole is configured to pass through a first injection region.

3 Claims, 8 Drawing Sheets

(51) Int. Cl.
*F02M 61/14* (2006.01)
*F02M 61/18* (2006.01)

(58) Field of Classification Search
USPC .............. 123/53.6, 73 C, 298, 299, 300, 470
See application file for complete search history.

(56) References Cited

FOREIGN PATENT DOCUMENTS

| JP | 2007-231908 A | 9/2007 |
|----|---------------|--------|
| JP | 2013-83271 A | 5/2013 |
| JP | 2015-529783 A | 10/2015 |
| JP | 2018-513936 A | 5/2018 |

OTHER PUBLICATIONS

International Search Report and Written Opinion of the International Searching Authority for International Application No. PCT/JP2021/002778, dated Apr. 6, 2021.

* cited by examiner

View A

FIG. 3B

View B

OPPOSED-PISTON ENGINE

TECHNICAL FIELD

The present disclosure relates to an opposed-piston engine.

BACKGROUND

As a two-stroke diesel engine, there is an opposed-piston engine in which two pistons are disposed opposite to each other in one cylinder. Patent Document 1 discloses an example of the configuration of the opposed-piston engine. The opposed-piston engine needs to discharge a combustion gas in the cylinder and take in new combustion air into the cylinder during one round trip of the piston. Thus, an air supply port formed in a cylinder wall is inclined to cause intake air taken in from the air supply port to form a swirling flow, thereby enhancing an effect of exchanging an exhaust gas and the intake air.

CITATION LIST

Patent Literature

Patent Document 1: U.S. Pat. No. 9,631,549B

SUMMARY

Technical Problem

In an opposed-piston engine, fuel is injected from a fuel injection device disposed on a side surface of a cylinder. Thus, it has been confirmed that the fuel injected into the cylinder is flowed into a swirling flow formed in the cylinder depending on an injection direction of the fuel, and combustion occurs in an outer peripheral region of a combustion chamber. Due to the spread of a flame in the outer peripheral region of the fuel chamber, a high-temperature portion is formed in an outer peripheral section of a piston top surface where a cooling action from the inside of a piston is difficult to reach, which may increase a heat load of a cylinder liner, and may cause a problem such as poor sliding of the piston due to worsening of piston lubrication (deterioration of lubricant oil) or generation of a thermal stress in the cylinder liner.

The present disclosure was made in view of the above, and an object of the present disclosure is to solve the above problem caused by the formation of the high-temperature portion in the outer peripheral section of the piston top surface.

Solution to Problem

In order to achieve the above object, an opposed-piston engine according to the present disclosure is an opposed-piston engine that includes at least one cylinder, a first piston disposed on one side in an axial direction in the at least one cylinder, a second piston disposed on another side in the axial direction in the at least one cylinder, an air supply port formed in a wall surface of the at least one cylinder on the one side in the axial direction in the cylinder, an exhaust port formed in the wall surface of the at least one cylinder on the another side in the axial direction in the one cylinder, and a first fuel injection device configured to inject fuel from the wall surface of the at least one cylinder into the cylinder, and a second fuel injection device disposed to be displaced in a circumferential direction so as to be opposite to the first fuel injection device across an axial center of the cylinder. Each of the first fuel injection device and the second fuel injection device includes a plurality of injection holes having different injection directions, in a cross-section orthogonal to the axial direction. If, in the plurality of injection holes of the first fuel injection device, an injection hole which is directed to a most upstream side with respect to a flow direction of a swirl flow formed in the cylinder is defined as a first upstream injection hole, and an injection hole directed to a most downstream side with respect to the swirl flow is defined as a first downstream injection hole; an angular region demarcated by a direction directed by the first upstream injection hole and a direction directed by the first downstream injection hole is defined as a first injection region; in the plurality of injection holes of the second fuel injection device, an injection hole which is directed to a most upstream side with respect to the flow direction of the swirl flow formed in the cylinder is defined as a second upstream injection hole, and an injection hole directed to a most downstream side with respect to the swirl flow is defined as a second downstream injection hole; and an angular region demarcated by a direction directed by the second upstream injection hole and a direction directed by the second downstream injection hole is defined as a second injection region, the direction directed by the first downstream injection hole is configured to pass through the second injection region; and the direction directed by the second downstream injection hole is configured to pass through the first injection region.

Advantageous Effects

With an opposed-piston engine according to the present disclosure, it is possible to suppress the spread of a flame to an outer peripheral region of a combustion chamber, and to suppress formation of a high-temperature portion in an outer peripheral section of a piston top surface, making it possible to suppress poor sliding of a piston, generation of a thermal stress in a cylinder liner, or the like, and to suppress a decrease in combustion efficiency due to interference between injected fuels.

DETAILED DESCRIPTION

Some embodiments of the present invention will be described below with reference to the accompanying drawings. It is intended, however, that unless particularly specified, dimensions, materials, shapes, relative positions and the like of components described in the embodiments or shown in the drawings shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

Figure 1:
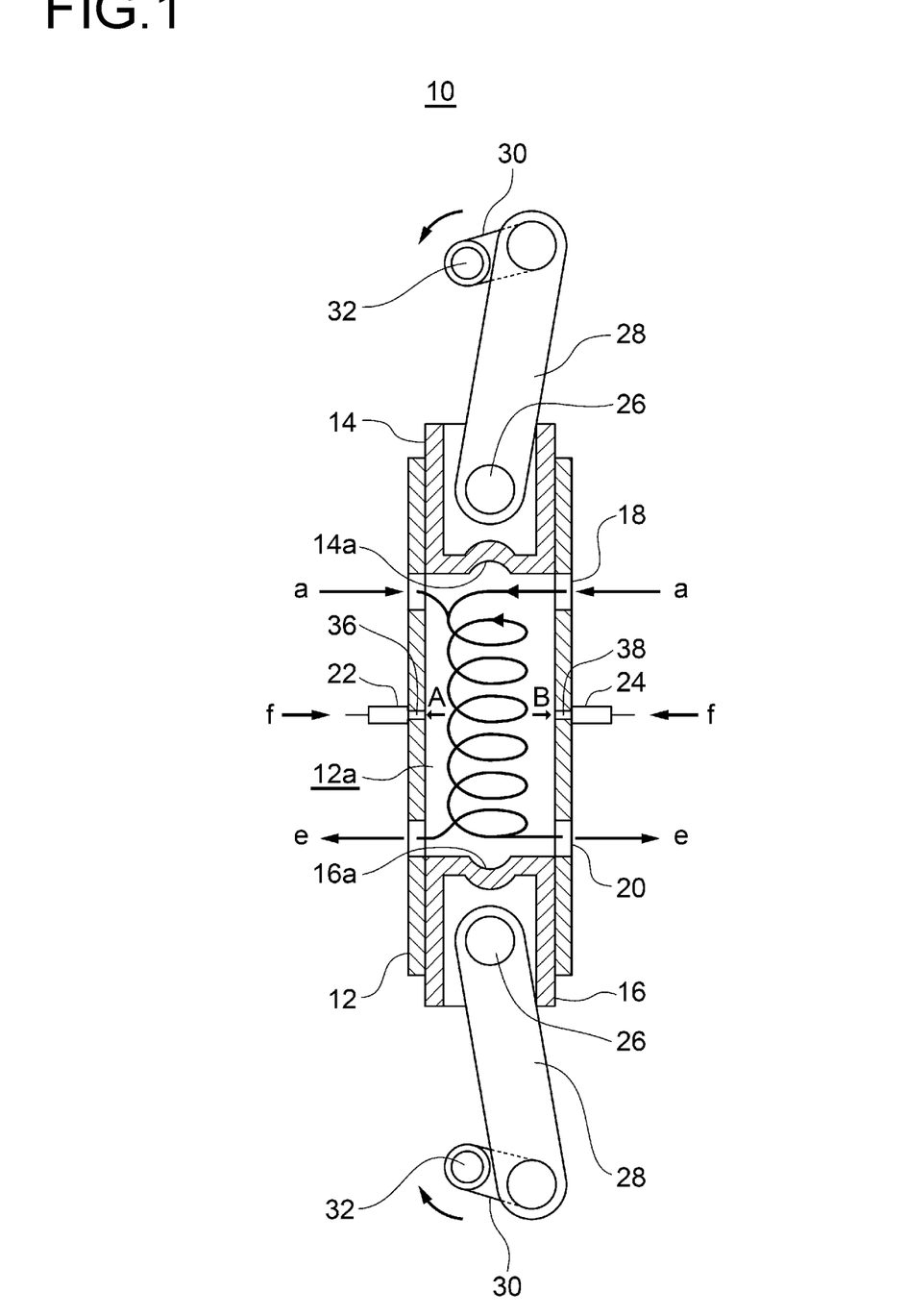
FIG. 1 is a longitudinal cross-sectional view of an opposed-piston engine according to an embodiment.

FIG. 1 is a longitudinal cross-sectional view of an opposed-piston engine according to an embodiment. An opposed-piston engine 10 includes at least one cylinder 12 internally forming a cylinder bore 12a, a piston 14 (first piston) is disposed on one side of the cylinder bore 12a in the axial direction, and a piston 16 (second piston) is disposed on another side of the cylinder bore 12a. Further, at least one air supply port 18 is formed in a circumferential wall surface of the cylinder 12 on the one side of the cylinder bore 12a in the axial direction, and at least one exhaust port 20 is formed in the circumferential wall surface of the cylinder 12 on the another side of the cylinder bore 12a in the axial direction.

In one embodiment, as shown in FIG. 1, a plurality of air supply ports 18 and a plurality of exhaust ports 20 are, respectively, disposed in the circumferential direction of the cylinder 12.

Figure 2A:
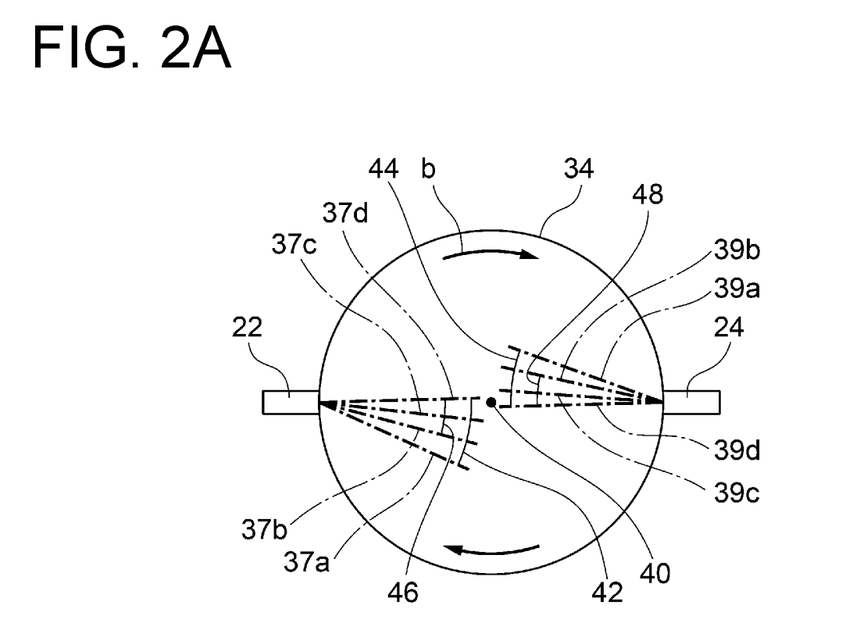
FIG. 2A is a schematic view showing a directivity direction of a fuel injection port of the opposed-piston engine according to an embodiment.
Figure 2B:
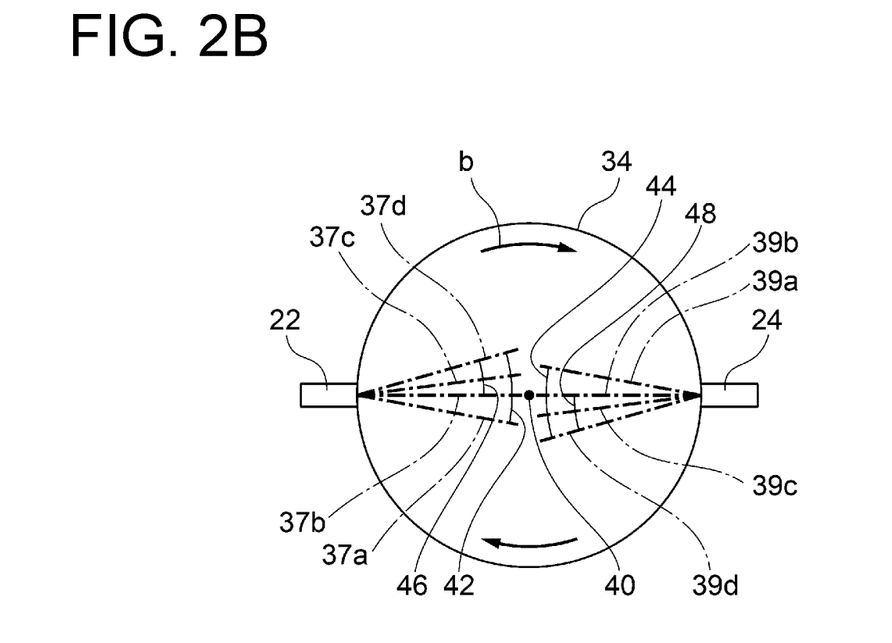
FIG. 2B is a schematic view showing a directivity direction of a fuel injection port of a conventional opposed-piston engine.

FIGS. 2A and 2B are each a view schematically showing a transverse cross-section 34 of the cylinder 12. As shown in FIGS. 2A and 2B, the opposed-piston engine 10 is provided with a fuel injection device 22 (first fuel injection device) for injecting fuel f into the cylinder bore 12a on the circumferential wall surface of the cylinder 12, and is provided with a fuel injection device 24 (second fuel injection device) on the cylinder circumferential wall surface displaced in the circumferential direction so as to be opposite to the fuel injection device 22 across an axial center 40 of the cylinder 12 (a center of a radial cross-section of the cylinder bore 12a). The fuel injection devices 22 and 24, respectively, have injection holes 36 and 38 for injecting the fuel f into the cylinder bore 12a. The injection holes 36 and 38 are, respectively, constituted by the plurality of injection holes having different injection directions toward the cylinder bore 12a in the cross-section 34 orthogonal to the axial direction of the cylinder 12.

Figure 3A:
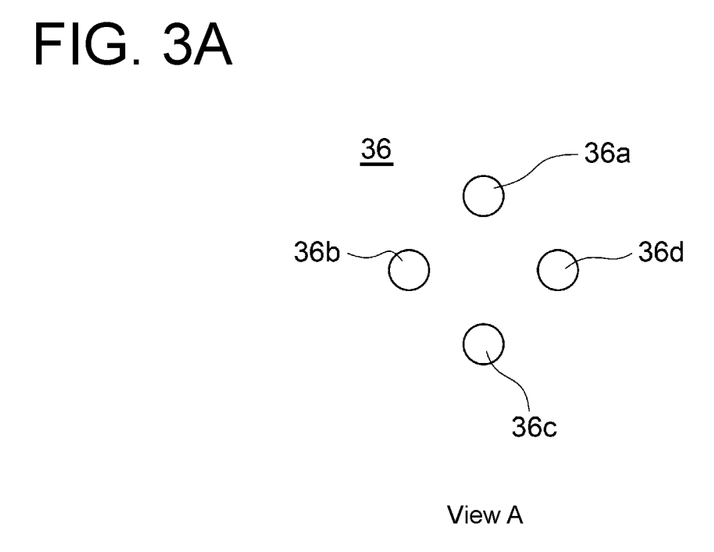
FIG. 3A is a schematic view showing the arrangement of a plurality of injection holes according to an embodiment as viewed from the direction of an arrow A in FIG. 1.
Figure 3B:
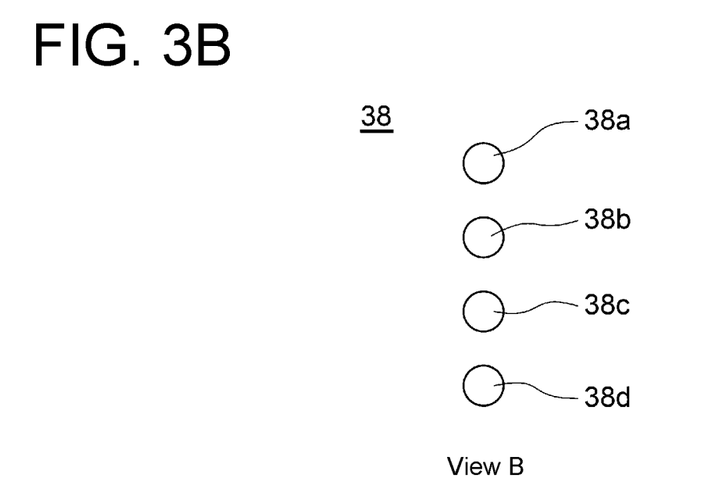
FIG. 3B is a schematic view showing the arrangement of a plurality of injection holes according to an embodiment as viewed from the direction of an arrow B in FIG. 1.

FIG. 3A illustrates an embodiment showing the arrangement of the plurality of injection holes respectively constituting the injection holes 36. FIG. 3B illustrates an embodiment showing the arrangement of the plurality of injection holes respectively constituting the injection holes 38. In the example shown in FIG. 3A, a plurality of injection holes 36a, 36b, 36c, and 36d are arranged to be located at corners of a virtual square, respectively. In the example shown in FIG. 3B, a plurality of injection holes 38a, 38b, 38c, and 38d are arranged linearly along the vertical direction. The injection holes 36a to 36d may be arranged as shown in FIG. 3B, and the injection holes 38a to 38d may be arranged as shown in FIG. 3A. Alternatively, the plurality of injection holes are not limited to the arrangements respectively shown in FIGS. 3A and 3B, but may be arranged linearly in the horizontal direction, for example. Further, the number of plurality of injection holes is not limited to the number shown in the figure.

By devising an injection angle of the air supply port 18 formed in the circumferential wall surface of the cylinder 12, supply air a injected from the air supply port 18 to the cylinder bore 12a forms a swirling flow (swirl flow) in the cylinder bore 12a. By forming the swirling flow, it is possible to enhance an effect of exchanging the supply air and an exhaust gas in the cylinder bore 12a in air supply and exhaust stroke.

The pistons 14 and 16 reciprocate in the cylinder 12 so as to reach a position where they are closest to each other in the cylinder bore 12a (hereinafter, will also be referred to as a "TDC position") at the same timing, and to reach a position where they are farthest from each other (hereinafter, will also be referred to as a "BDC position") at the same timing. The fuel injection devices 22 and 24 inject the fuel f into the cylinder bore 12a when the pistons 14 and 16 reach the TDC position, and the fuel f injected into the cylinder bore 12a ignites in the high-temperature atmosphere of the cylinder bore 12a, and forms a flame.

In an embodiment, as shown in FIG. 1, the pistons 14 and 16 are each connected to one end of a connecting rod 28 via a piston pin 26, and another end of the connecting rod 28 is connected to a crankshaft 30. With a rotation of the crankshaft 30 about a rotational shaft 32, the pistons 14 and 16 reciprocate in the cylinder 12 in synchronization with each other.

FIGS. 2A and 2B are views showing the injection directions of the fuel injected from the plurality of injection holes 36a to 36d and 38a to 38d of the fuel injection devices 22 and 24, respectively. FIG. 2A shows the injection directions of the injection holes according to an embodiment, and FIG. 2B shows the injection directions of the conventional injection holes. In each of these figures, an arrow b indicates a direction of the swirl flow, 37a to 37d respectively indicate axes of the plurality of injection holes 36a to 36d formed in the fuel injection device 22, and 39a to 39d respectively indicate axes of the plurality of injection holes 38a to 38d formed in the fuel injection device 24. Each axis indicates the injection direction directed by a corresponding one of the injection holes. As shown in FIGS. 3A and 3B, the plurality of injection holes respectively formed in the fuel injection devices 22 and 24 are appropriately arranged in the circumferential wall surface of the cylinder 12.

As described above, in the plurality of injection holes 36a to 36d of the fuel injection device 22, the injection hole (the injection hole having the axis 37a) directed to a most upstream side with respect to the flow direction b of the swirl flow is defined as a first upstream injection hole and the injection hole directed to a most downstream side with respect to the flow direction b is defined as a first downstream injection hole (the injection hole having the axis 37d), and an angular region demarcated by a direction directed by the first upstream injection hole and a direction directed by the first downstream injection hole is defined as a first injection region (a first injection region 42 in FIGS. 2A and 2B). Further, in the plurality of injection holes of the fuel injection device 24, the injection hole directed to a most upstream side with respect to the flow direction b of the swirl flow is defined as a second upstream injection hole (the injection hole having the axis 39a) and the injection hole directed to a most downstream side with respect to the flow direction b is defined as a second downstream injection hole (the injection hole having the axis 39d), and an angular region demarcated by a direction directed by the second upstream injection hole and a direction directed by the second downstream injection hole is defined as a second injection region (a second injection region 44 in FIGS. 2A and 2B).

As shown in FIG. 2A, the direction directed by the first downstream injection hole (the direction of the axis 37d) is configured to pass through the second injection region 44, and the direction directed by the second downstream injection hole (the direction of the axis 39d) is configured to pass through the first injection region 42. In other words, a positional relationship between the first injection region 42 and the second injection region 44 is such that they overlap each other in a downstream region of the both injection regions with respect to the flow direction b. Thus, the fuel f injected from the plurality of injection holes 36a to 36d and 38a to 38d of the fuel injection devices 22 and 24 is not directed to the center side of the swirl flow, but is directed to the upstream side in the flow direction of the swirl flow. Therefore, the fuel f can be directed to the center of the swirling flow, that is, the center position of the cylinder bore 12a, against the swirl flow. Thus, it is possible to suppress the spread of the flame formed in the cylinder bore 12a to an outer peripheral region of a combustion chamber, making it possible to suppress formation of a high-temperature portion in an outer peripheral section of a piston top surface. Therefore, it is possible to suppress poor sliding of the pistons 14 and 16, generation of a thermal stress in a cylinder liner, or the like.

Further, in the opposed-piston engine 10, since the piston 14 and the piston 16 move in a direction away from each other in fuel injection, the expansion of the cylinder bore 12a suppresses interference between the fuels respectively injected from the fuel injection devices 22 and 24 into the cylinder bore 12a. Thus, it is possible to suppress a decrease in combustion efficiency.

In an embodiment, as shown in FIG. 1, piston cavities 14a and 16a are formed in top surfaces of the pistons 14 and 16, respectively. By forming the piston cavities 14a and 16a, when the pistons 14 and 16 move away from each other in fuel injection, a diffusion action to the outer peripheral region works at a stage where a distance between the pistons is short, making it possible to further improve the effect of suppressing the interference between the fuels respectively injected from the fuel injection devices 22 and 24.

In the conventional fuel injection pattern shown in FIG. 2B, the directivity directions of the fuel f injected from the fuel injection devices 22 and 24 (the directions of the respective axes 37a to 37d and 39a to 39d) are directed to the center position of the cylinder bore 12a. In this case, the fuel f is flowed downstream by the swirl flow and is combusted in the outer peripheral region of the combustion chamber. Thus, the high-temperature portion is likely to be formed in the outer peripheral section of the piston top surface, which is likely to result in worsening of piston lubrication or generation of the thermal stress in the cylinder liner.

In an embodiment, the fuel injection device 22 and the fuel injection device 24 are disposed to be displaced from each other within 180°±1° in the circumferential direction of the cylinder 12.

As described above, in the plurality of injection holes of the fuel injection device 22, an injection hole directed to a portion between the direction directed by the first upstream injection hole (the direction of the axis 37a in FIG. 2A) and the direction directed by the first downstream injection hole (the direction of the axis 37d of FIG. 2A) is defined as a first intermediate injection hole (the injection hole having the axis 37b or the axis 37c in FIG. 2A), and an angular region demarcated by a direction directed by the first intermediate injection hole and the direction directed by the first downstream injection hole is defined as a first downstream injection region (a first downstream injection region 46 in FIGS. 2A and 2B). Further, in the plurality of injection holes of the fuel injection device 24, an injection hole directed to a portion between the direction directed by the second upstream injection hole (the direction of the axis 39a in FIG. 2A) and the direction directed by the second downstream injection hole (the direction of the axis 39d of FIG. 2A) is defined as a second intermediate injection hole, and an angular region demarcated by a direction directed by the second intermediate injection hole (the direction of the axis 39b or the axis 39c in FIG. 2A) and the direction directed by the second downstream injection hole is defined as a second downstream injection region (a second downstream injection region 48 in FIGS. 2A and 2B).

In an embodiment, as shown in FIG. 2A, the direction directed by the first downstream injection hole (the direction of the axis 37d) is configured to pass through the second downstream injection region 48, and the direction directed by the second downstream injection hole (axis 39d) is configured to pass through the first downstream injection region 46. Thus, relative to the above-described embodiment, it is possible to further direct the respective injection holes of the fuel injection devices 22 and 24 to the upstream side in the flow direction b of the swirl flow. So to speak, the overlapping region of the first injection region 42 and the second injection region 44 is reduced relative to the above-described embodiment, making it possible to further direct the respective injection holes of the fuel injection devices 22 and 24 to the upstream side in the flow direction b of the swirl flow relative to the above-described embodiment. Thus, it is possible to further increase the directivity of the fuel f, which is injected from the respective injection holes of the fuel injection devices 22 and 24, toward the center position of the cylinder bore 12a against the swirl flow, making it possible to further enhance the effect of suppressing spread of the flame to the outer peripheral region of the combustion chamber.

In the above-described embodiment, the first intermediate injection hole may be the injection hole having the axis 37b or the injection hole having the axis 37c. If the first intermediate injection hole is the injection hole having the axis 37c, the overlapping region of the first injection region 42 and the second injection region 44 is further reduced, making it possible to set the directivity directions of the plurality of injection holes of the fuel injection device 22 and the fuel injection device 24 toward the further upstream side with respect to the swirl flow. Thus, it is possible to increase the directivity of the fuel f, which is injected from the respective injection holes of the fuel injection devices 22 and 24, toward the center position of the swirl flow against the swirl flow. Likewise, the second intermediate injection hole may be the injection hole having the axis 39b or the injection hole having the axis 39c. If the first intermediate injection hole is the injection hole having the axis 39c, it is possible to obtain the same effect as above.

In an embodiment, as shown in FIG. 2A, the plurality of injection holes of the fuel injection device 22 and the plurality of injection holes of the fuel injection device 24 are arranged symmetrically about the axial center 40 of the cylinder 12. Thus, it is easy to satisfy the arrangement of each of the above-described embodiments with respect to the directivity direction of each injection hole.

In order to arrange the plurality of injection holes of the fuel injection device 22 and the plurality of injection holes of the fuel injection device 24 symmetrically about the axial center 40 of the cylinder 12, for example, the number of injection holes, the directivity directions of the injection holes, an angle difference in the directivity directions of the respective injection holes, and the like are made equal between the both fuel injection devices.

In an embodiment, the opposed-piston engine 10 is configured to have a swirl ratio (indicating the number of rotations in the circumferential direction until the supply air supplied to the cylinder bore 12a is exhausted from the exhaust port) of 1 to 5. The swirl ratio is decided by an angle, flow rate, or the like of the supply air a flowing in from the air supply port 18, and with the swirl ratio of 1 to 5, it is possible to improve exchange characteristics between the supply air and the exhaust gas.

Figure 4:
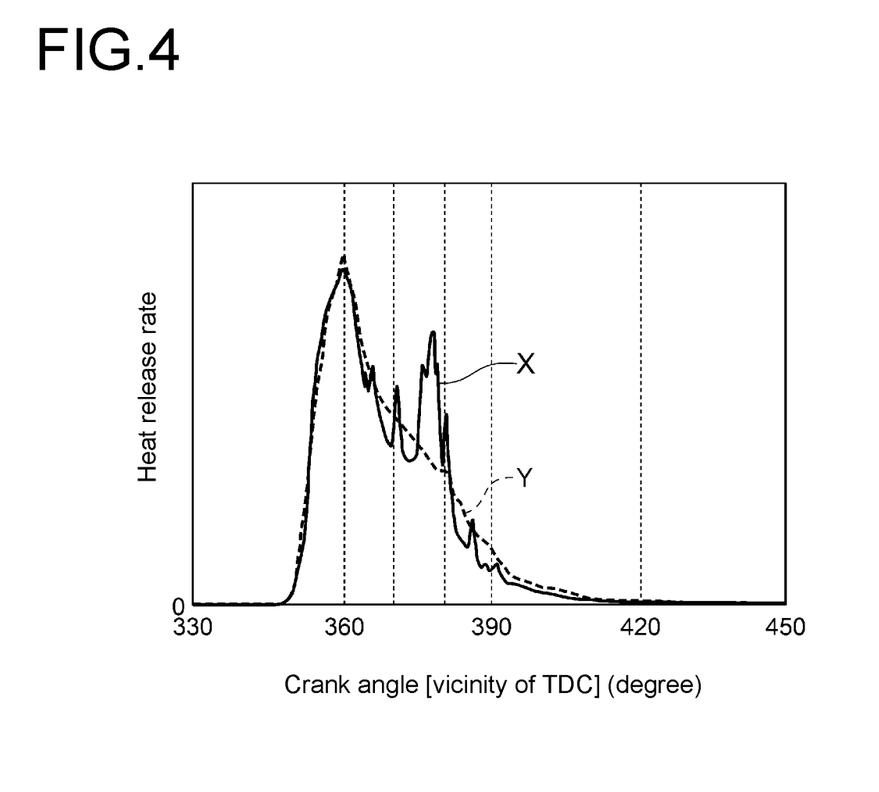
FIG. 4 is a chart showing a heat release rate when a piston is in the vicinity of a TDC position.

FIG. 4, FIG. 5A, FIG. 5B, FIG. 6A and FIG. 6B each show a result obtained by performing a numerical analysis with the directivity patterns of the plurality of injection holes shown in FIGS. 2A and 2B, respectively. FIG. 4 shows the heat release rate in the vicinity of the TDC position, where a line X indicates a case of the injection pattern according to an embodiment shown in FIG. 2A and a line Y indicates a case of the conventional injection pattern shown in FIG. 2B. From FIG. 4, it can be seen that the injection pattern X and the injection pattern Y have the same heat release end time after the TDC position. This indicates that in the injection pattern X, there is no ember or the like due to the interference between the fuels.

Figure 5A:
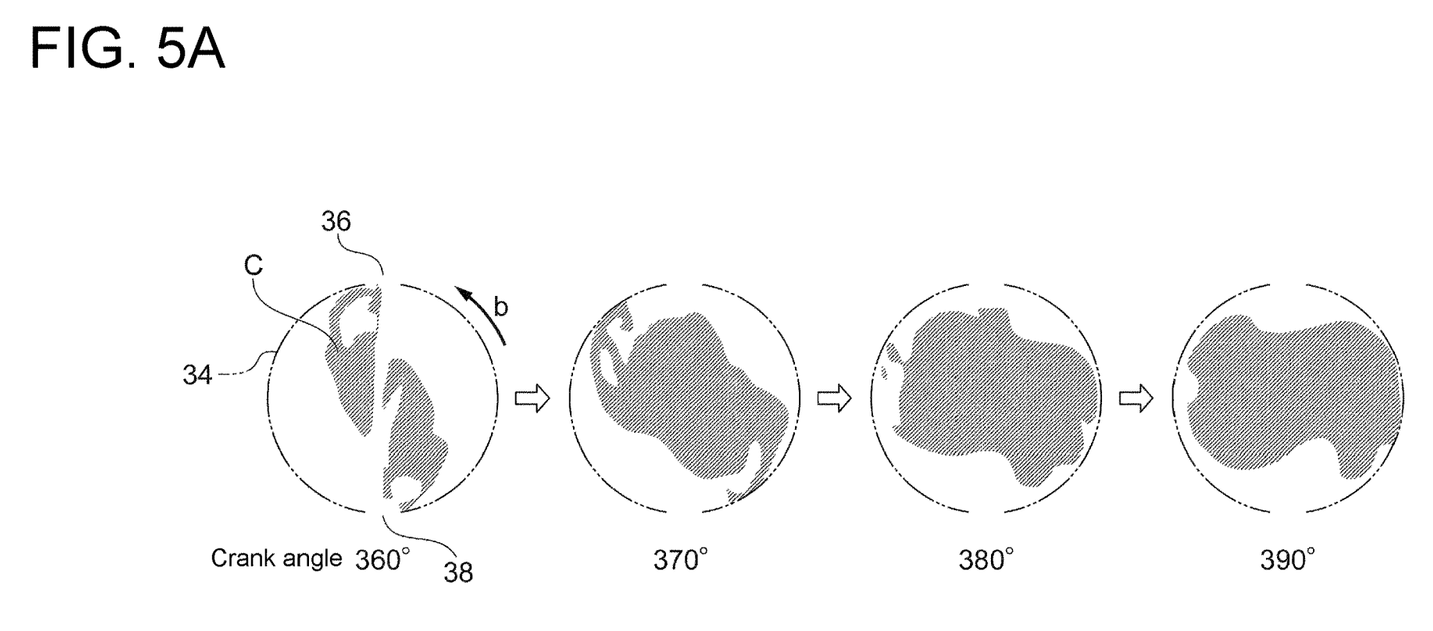
FIG. 5A is a schematic view showing the shape of a flame generated in a transverse cross-section of a cylinder according to an embodiment.
Figure 5B:
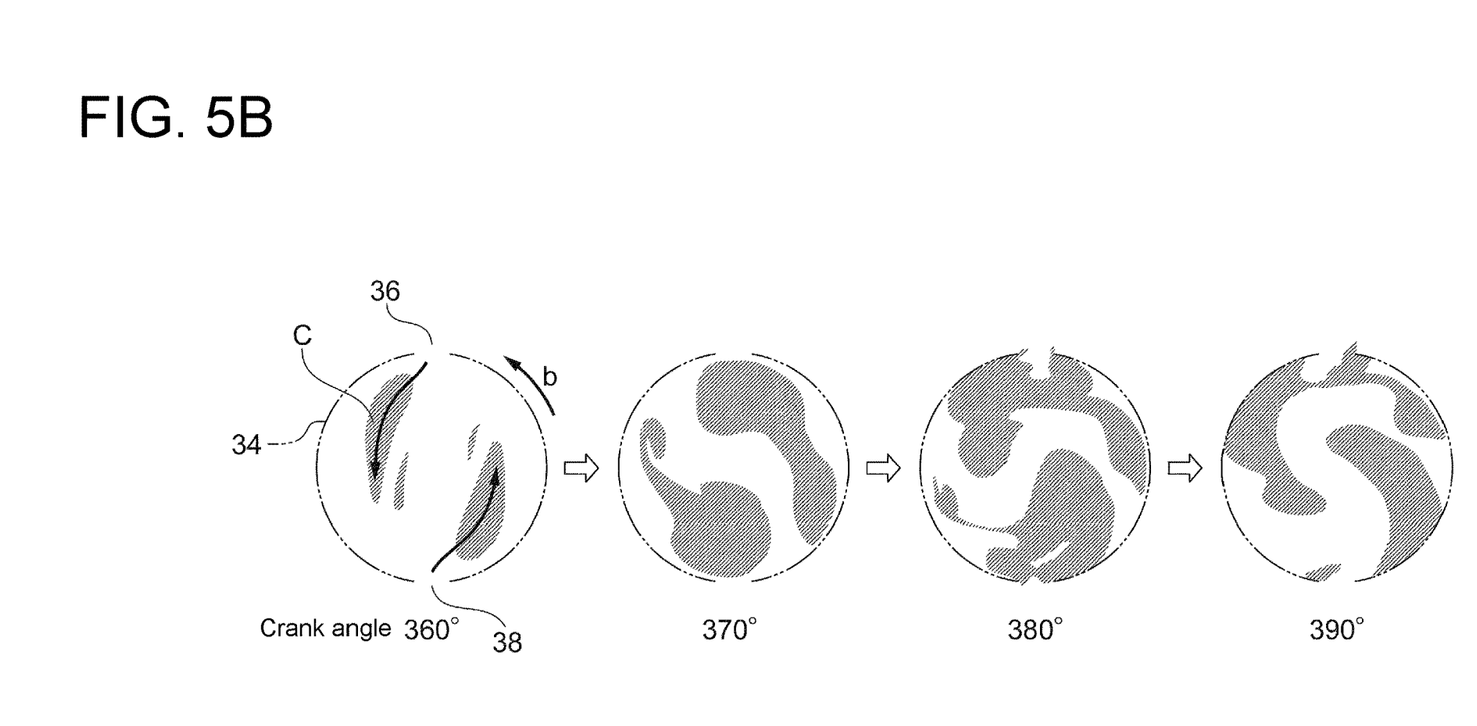
FIG. 5B is a schematic view showing the shape of a flame generated in a transverse cross-section of a cylinder in the conventional opposed-piston engine.

FIGS. 5A and 5B each show, for each crank angle, a formation state of a flame C (hatched area) formed by the fuel f injected from the injection holes 36 and 38 in the transverse cross-section 34. FIG. 5A shows the case of the injection pattern X according to an embodiment, and FIG. 5B shows the case of the conventional injection pattern Y. In the injection pattern X, it can be seen that the flame C is formed in the central portion of the combustion chamber, relative to the injection pattern Y. Thus, it is possible to reduce a heat loss due to the increasing temperature of the cylinder liner or the like, and to improve overall thermal efficiency as well.

Figure 6A:
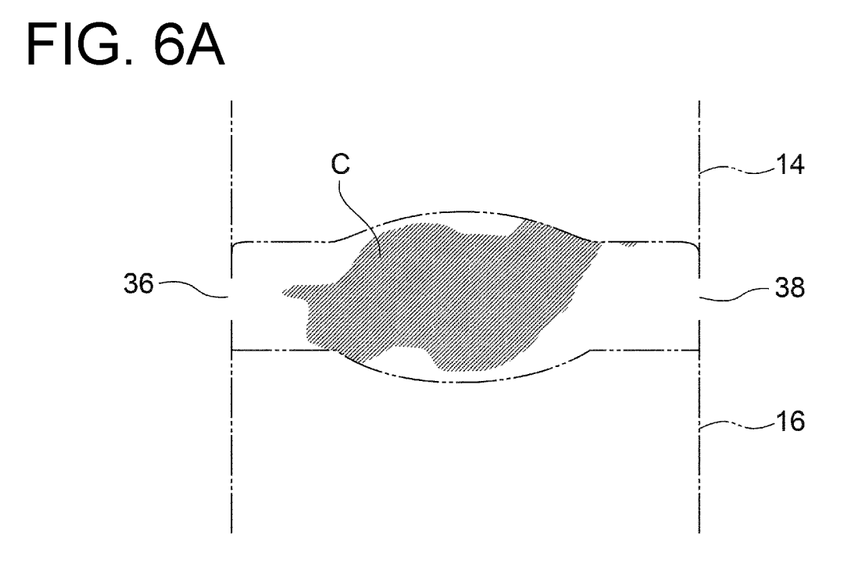
FIG. 6A is a schematic view showing the shape of the flame generated in a longitudinal cross-section of the cylinder according to an embodiment.
Figure 6B:
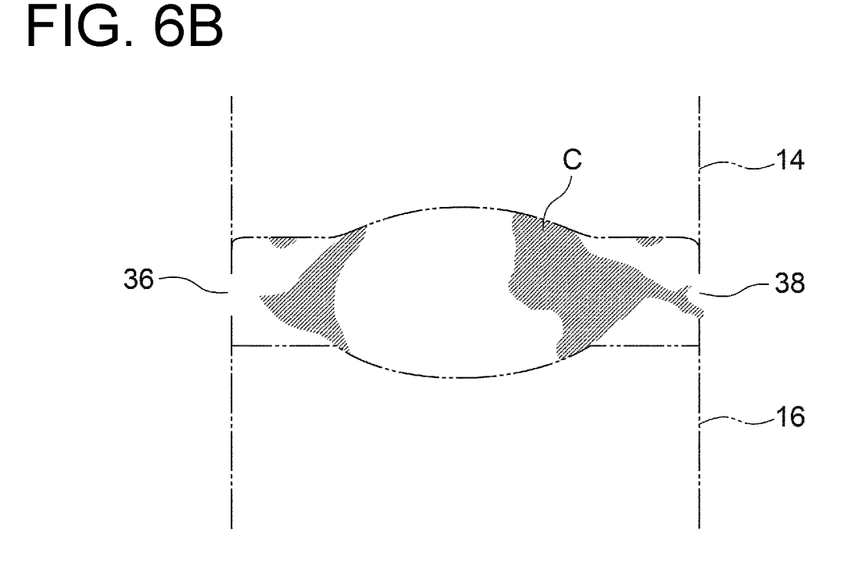
FIG. 6B is a schematic view showing the shape of the flame generated in a longitudinal cross-section of the cylinder in the conventional opposed-piston engine.

FIGS. 6A and 6B are each a view of the state of the flame C formed in the piston cavity in the vicinity of the TDC position as viewed from a direction along the axis of the cylinder 12 (a direction orthogonal to the transverse cross-section 34), and each show the state of the flame C at the crank angle of 370°. FIG. 6A shows the case of the injection pattern X according to an embodiment, and FIG. 6B shows the case of the conventional injection pattern Y. In the case of the injection pattern X, it can be seen that the spread of the flame C to the outer peripheral region of the combustion chamber is suppressed, and the flame C is formed in the central region of the combustion chamber. On the other hand, in the case of the injection pattern Y, it can be seen that the flame C is drawn into the outer peripheral region of the combustion chamber by the swirl flow, and the flame C is not formed in the central region of the combustion chamber. It can be seen that interference between the flames is suppressed.

The contents described in the above embodiments would be understood as follows, for instance.

1) An opposed-piston engine according to an aspect is an opposed-piston engine (10) that includes at least one cylinder (12), a first piston (14) disposed on one side in an axial direction in the at least one cylinder (12), a second piston (16) disposed on another side in the axial direction in the at least one cylinder (12), an air supply port (18) formed in a wall surface of the at least one cylinder (12) on the one side in the axial direction in the cylinder (12), an exhaust port (20) formed in the wall surface of the at least one cylinder (12) on the another side in the axial direction in the cylinder (12), and a first fuel injection device (22) configured to inject fuel from the wall surface of the at least one cylinder (12) into the cylinder (12), and a second fuel injection device (24) disposed to be displaced in a circumferential direction so as to be opposite to the first fuel injection device (22) across an axial center (40) of the cylinder (12). Each of the first fuel injection device (22) and the second fuel injection device (24) includes a plurality of injection holes (36, 38) having different injection directions, in a cross-section (34) orthogonal to the axial direction. If, in the plurality of injection holes (36 (36a, 36b, 36c, 36d)) of the first fuel injection device (22), an injection hole which is directed to a most upstream side with respect to a flow direction (b) of a swirl flow formed in the cylinder (12) is defined as a first upstream injection hole (the injection hole having the axis 37a), and an injection hole directed to a most downstream side with respect to the swirl flow is defined as a first downstream injection hole (the injection hole having the axis 37d); an angular region demarcated by a direction directed by the first upstream injection hole and a direction directed by the first downstream injection hole is defined as a first injection region (42); in the plurality of injection holes (38 (38a, 38b, 38c, 38d)) of the second fuel injection device, an injection hole which is directed to a most upstream side with respect to the flow direction (b) of the swirl flow formed in the cylinder (12) is defined as a second upstream injection hole (the injection hole having the axis 39a), and an injection hole directed to a most downstream side with respect to the swirl flow is defined as a second downstream injection hole (the injection hole having the axis 39d); and an angular region demarcated by a direction directed by the second upstream injection hole and a direction directed by the second downstream injection hole is defined as a second injection region (44), the direction directed by the first downstream injection hole is configured to pass through the second injection region (44); and the direction directed by the second downstream injection hole is configured to pass through the first injection region (42).

With such configuration, since the direction directed by the above-described first downstream injection hole is configured to pass through the above-described second injection region and the direction directed by the above-described second downstream injection hole is configured to pass through the above-described first injection region, it is possible to set the directivity direction of each injection hole of the first fuel injection device and the second fuel injection device toward the upstream side in the flow direction of the swirling flow. Thus, the fuel injected from the above-described first fuel injection device and the above-described second fuel injection device can be directed to the center of the swirling flow formed in the cylinder, against the above-described swirling flow. Therefore, it is possible to suppress the spread of the flame to the outer peripheral region of the combustion chamber, making it possible to suppress formation of the high-temperature portion in the outer peripheral section of the piston top surface. Further, in the opposed-piston engine, since the first piston and the second piston move in the direction away from the TDC position where they are closest to each other in fuel injection, with the expansion of the space between the pistons, it is possible to suppress the decrease in combustion efficiency caused by the interference between the injected fuels.

2) An opposed-piston engine according to another aspect is the opposed-piston engine as defined in 1), where if, in the plurality of injection holes (36) of the first fuel injection device (22), an injection hole which is directed to a portion between the direction directed by the first upstream injection hole and the direction directed by the first downstream injection hole is defined as a first intermediate injection hole (the injection hole having the axis 37b or 37c); an angular region demarcated by a direction directed by the first intermediate injection hole and the direction directed by the first downstream injection hole is defined as a first downstream injection region (46); in the plurality of injection holes of the second fuel injection device (24), an injection hole which is directed to a portion between the direction directed by the second upstream injection hole and the direction directed by the second downstream injection hole is defined as a second intermediate injection hole (the injection hole having the axis 39b or 39c); and an angular region demarcated by a direction directed by the second intermediate injection hole and the direction directed by the second downstream injection hole is defined as a second downstream injection region (48), the direction directed by the first downstream injection hole is configured to pass through the second downstream injection region (48); and the direction directed by the second downstream injection hole is configured to pass through the first downstream injection region (46).

With such configuration, since the direction directed by the first downstream injection hole is configured to pass through the above-described second downstream injection region and the direction directed by the second downstream injection hole is configured to pass through the above-described first downstream injection region, it is possible to set the directivity direction of each injection hole of the first fuel injection device and the second fuel injection device toward the further upstream side in the flow direction of the swirling flow. Thus, it is possible to increase the directivity toward the center of the swirling flow formed in the cylinder against the above-described swirling flow, making it possible to enhance the effect of suppressing the spread of the flame to the outer peripheral region of the combustion chamber.

3) An opposed-piston engine according to still another aspect is the opposed-piston engine as defined in 1) or 2), where the plurality of injection holes of the first fuel injection device (22) and the plurality of injection holes of the second fuel injection device (24) are arranged symmetrically about the axial center (40) of the cylinder (12).

With such configuration, it is easy to satisfy the conditions as defined in 1) or 2) which are related to the directivity directions of the injection holes belonging to the both fuel injection devices.

REFERENCE SIGNS LIST

10 Opposed-piston engine
12 Cylinder
12a Cylinder bore
14 Piston (first piston)
16 Piston (second piston)
18 Air supply port
20 Exhaust port
22 Fuel injection device (first fuel injection device)
24 Fuel injection device (second fuel injection device)
26 Piston pin
28 Connecting rod
30 Crankshaft
32 Rotational shaft
34 Cylinder transverse cross-section
36 (36a, 36b, 36c, 36d), 38 (38a, 38b, 38c, 38d) Injection hole
37a, 37b, 37c, 37d, 39a, 39b, 39c, 39d Axis
40 Axial center
42 First injection region
44 Second injection region
46 First downstream injection region
48 Second downstream injection region
C Flame
a Supply air
b Swirl flow direction
f Fuel

The invention claimed is:
1. An opposed-piston engine, comprising:
at least one cylinder;
a first piston disposed on one side in an axial direction in the at least one cylinder;
a second piston disposed on another side in the axial direction in the at least one cylinder;
an air supply port formed in a wall surface of the at least one cylinder on the one side in the axial direction in the cylinder;
an exhaust port formed in the wall surface of the at least one cylinder on the another side in the axial direction in the cylinder; and
a first fuel injection device configured to inject fuel from the wall surface of the at least one cylinder into the cylinder, and a second fuel injection device disposed to be displaced in a circumferential direction so as to be opposite to the first fuel injection device across an axial center of the cylinder,
wherein each of the first fuel injection device and the second fuel injection device includes a plurality of injection holes having different injection directions, in a cross-section orthogonal to the axial direction, and
wherein if, in the plurality of injection holes of the first fuel injection device, an injection hole which is directed to a most upstream side with respect to a flow direction of a swirl flow formed in the cylinder is defined as a first upstream injection hole, and an injection hole directed to a most downstream side with respect to the swirl flow is defined as a first downstream injection hole;

an angular region demarcated by a direction directed by the first upstream injection hole and a direction directed by the first downstream injection hole is defined as a first injection region;

in the plurality of injection holes of the second fuel injection device, an injection hole which is directed to a most upstream side with respect to the flow direction of the swirl flow formed in the cylinder is defined as a second upstream injection hole, and an injection hole directed to a most downstream side with respect to the swirl flow is defined as a second downstream injection hole; and an angular region demarcated by a direction directed by the second upstream injection hole and a direction directed by the second downstream injection hole is defined as a second injection region, the direction directed by the first downstream injection hole is configured to pass through the second injection region; and the direction directed by the second downstream injection hole is configured to pass through the first injection region.

2. The opposed-piston engine according to claim 1,
wherein if, in the plurality of injection holes of the first fuel injection device, an injection hole which is directed to a portion between the direction directed by the first upstream injection hole and the direction directed by the first downstream injection hole is defined as a first intermediate injection hole;

an angular region demarcated by a direction directed by the first intermediate injection hole and the direction directed by the first downstream injection hole is defined as a first downstream injection region;

in the plurality of injection holes of the second fuel injection device, an injection hole which is directed to a portion between the direction directed by the second upstream injection hole and the direction directed by the second downstream injection hole is defined as a second intermediate injection hole; and an angular region demarcated by a direction directed by the second intermediate injection hole and the direction directed by the second downstream injection hole is defined as a second downstream injection region, the direction directed by the first downstream injection hole is configured to pass through the second downstream injection region; and the direction directed by the second downstream injection hole is configured to pass through the first downstream injection region.

3. The opposed-piston engine according to claim 1,
wherein the plurality of injection holes of the first fuel injection device and the plurality of injection holes of the second fuel injection device are arranged symmetrically about the axial center of the cylinder.

* * * * *